April 7, 1931.  J. G. STAUS  1,799,185
WHEEL STICK
Filed Sept. 20, 1929
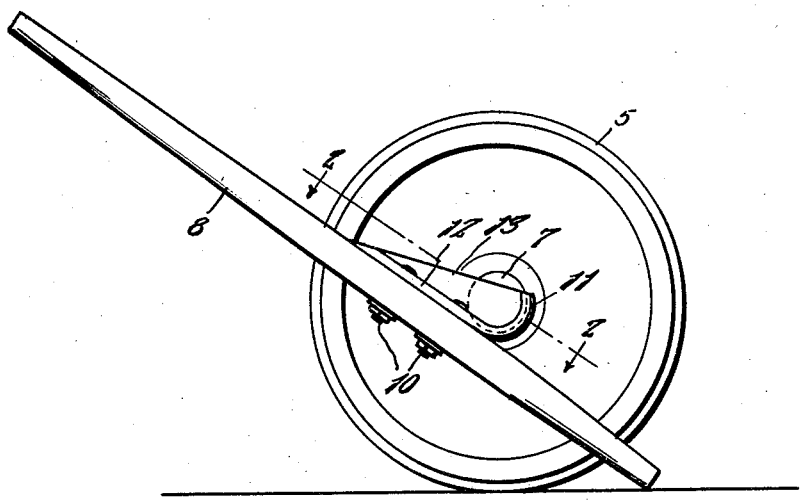
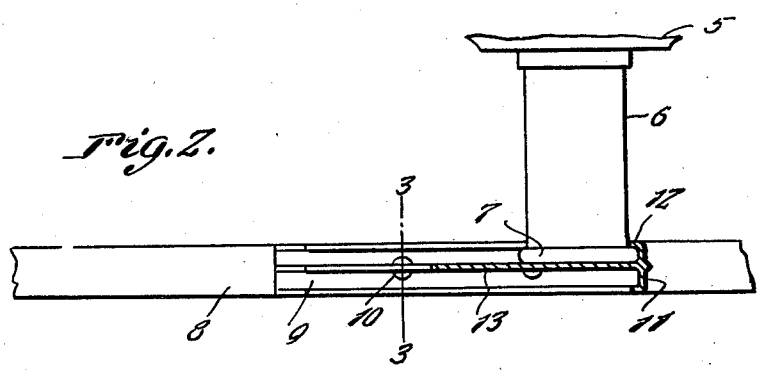
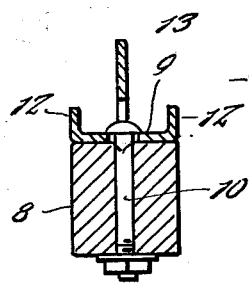
Inventor
John G. Staus
By Clarence A. O'Brien
Attorney Patented Apr. 7, 1931

1,799,185

UNITED STATES PATENT OFFICE

JOHN G. STAUS, OF EL PASO, TEXAS

WHEEL STICK

Application filed September 20, 1929. Serial No. 394,103.

This invention relates to wheel sticks, and has as its primary object the provision of a device of this nature, which is especially adapted to assist in moving wheels journaled on an axle from one place to another.

A primary object of the invention is the provision of a wheel stick especially adapted for use in moving railway wheels from one place to another, when the wheels are secured on an axle, the nature of the invention being such as to enable the stick to be placed at one end of the axle for engaging the same, whereby the axle may be raised a certain height for lifting one of the wheels from the ground, thus enabling assistance to the operator of the wheel stick to rotate the other wheel, remote from that end of the axle engaged by the wheel stick for moving the railway wheel to any desired place.

A still further object of the invention is to provide a wheel stick especially adapted for the purpose above mentioned, which will enable one to handle wheels expeditiously, which may be readily and easily applied to one end of the axle, the construction of the axle receiving portion of the stick being such as to render it almost impossible to harm the axle, and to prevent cutting, marring or otherwise disfiguring the journal, since one of the salient features of this invention is to provide a wheel stick adapted to engage only the ends of the axle at the collar of the axle, thus rendering it impossible for one operating the stick to take hold of the journal.

A still further object of the invention is to provide a wheel stick of this nature, which is simple in construction, strong, durable, thoroughly reliable, efficient and practical in use and operation, and otherwise well adapted for the purpose designed.

Other objects and advantages of the invention will become apparent during a study of the following description, taken in connection with the accompanying drawings, wherein:

Figure 1 is a side elevation of my improved wheel stick, showing the application of the same to the axle of a pair of car wheels, Figure 2 is a detail view partly in section, and partly in elevation, taken on the line 2—2 of Figure 1 and looking in the direction of the arrows.

Figure 3 is a vertical transverse sectional view taken substantially on line 3—3 of Figure 2.

With reference more in detail to the drawing, it will be seen that I have denoted the car wheel, which may be of the usual construction by the reference character 5, the end of the axle on which the wheel is secured by the reference character 6, and the collar on the extreme end of the axle by the reference character 7.

The above elements are all of conventional construction, and a more detailed description thereof is deemed unnecessary.

As comprehended by this invention, the wheel stick comprises an elongated operating bar 8, which bar 8 may be formed of wood, metal or any other suitable construction, preferably wood, and is of suitable length. A plate 9 of somewhat channel formation in cross section extends longitudinally of the operating bar 8, and is bolted or otherwise secured as at 10 to the bar 8 adjacent the lower end of the bar, and spaced inwardly from said end of the bar 8. The plate 9 at what may be termed its forward or lower end terminates in an upwardly and inwardly curved extremity 11 to provide a seat for the outer end of the wheel axle 6.

The flanges 12—12 of the channel bar or plate 9 are continued forwardly, merging into the curved flanges of the curved extremity 11 of this plate 9.

A vertical partition member 13 of substantially triangular configuration extends longitudinally of the channel plate 9 intermediate the longitudinal edges of the plate, and the upper edge of the partition member 13 inclines rearwardly from the upper edge of the curved end 11 of the plate to merge at the substantially flat end of the plate as clearly suggested in Figure 2.

Of course, the vertical end of the partition member 13 is suitably curved to conform with the curved extremity 11 of the plate, and is welded or otherwise formed integral with the said end of the plate.

In using the wheel stick, it will be apparent that the same may be used from either the right or left hand side of Figure 1; however, for the sake of example I have shown the device being used from the left hand side of Figure 1. In this connection then, it will be seen that the collar 7 on the extremity of the wheel axle 6 is positioned between one of the flanges 12 and the partition member 13, after which a plate may be slid somewhat longitudinally and then upwardly to attain the position shown in Figure 1. When in this position, it will be seen that the collar 7 positioned between one of the flanges 12 and the partition member 13 has a portion of its peripheral edge disposed in the seat formed by the curved end portion of the plate 11, the curvature of this end portion being in conformity with the periphery of the collar 7.

When it is desired to raise this end of the axle 6 for raising the wheel 5 above the ground, obviously, the operator exerting a push upon the upper end of the rod 8 in a direction toward the right of Figure 1, will bring the rod 8 to a substantially vertical position or at an angle of ninety degrees. Thus when the bar 8 is in this vertical position, obviously due to the end of the rod 8 being of a length beginning at the curved end portion 11 of the plate to the lower extremity of the rod, of greater length than half the diameter of the wheel 5, or in other words, of a length greater than the distance above which the axle 6 is above the ground, obviously the axle will be raised at this end and the wheel thereby likewise raised above and out of contact with the ground, whereby the assistant to the operator who would be positioned at the other wheel (not shown) may rotate that wheel in order to move the pair of wheels and their axle to any desired place.

In view of the simplicity of the device, it is believed that a sufficient knowledge of the construction, operation, utility and advantages of a device of this nature will be clear to those skilled in the art from a study of the foregoing description, taken in connection with the accompanying drawing, and a more detailed description thereof is thus deemed unnecessary.

Minor changes in certain arrangements, details of construction, and materials used may of course be resorted to in actual practice without departing from the spirit of the invention as herein described, and the scope of the appended claims.

Having thus described my invention, what I wish to claim is:

1. In a device for raising one end of a car wheel axle, an elongated operating bar, a plate secured to said bar inwardly from one end of said bar, said plate terminating at one end in an upwardly and inwardly directed curved extension to provide a seat for the extremity of said axle, and a vertical member extending longitudinally of the plate and formed integral therewith, said member being adapted for rest against the outer end of the car wheel axle.

2. In a wheel stick of the class described, an elongated operating bar, a channelled plate secured to said bar inwardly from one end of said bar, said channelled plate adjacent one end thereof terminating in an upwardly and inwardly directed curved extremity, a vertical partition member rising from said plate longitudinally of the plate, said partition member tapering rearwardly from the curved extremity of said channeled plate, and the sides of said channeled plate adjacent said curved extremity adapted to provide a seat on opposite sides of said partition for accommodating the collar of a car wheel axle whereby said collar may be received between said partition member and a selected side of said channeled plate.

3. A wheel stick comprising in combination a plate provided with a flange, said flange adapted to support thereon a portion of a car wheel axle, and a member integral with said plate and disposed in spaced parallelism with said flange and adapted to engage the said axle adjacent the end of the latter.

In testimony whereof I affix my signature.

JOHN G. STAUS.